United States Patent
Lin et al.

(10) Patent No.: US 12,445,129 B2
(45) Date of Patent: Oct. 14, 2025

(54) PROXIMITY DETECTION METHOD AND CIRCUIT THEREOF

(71) Applicant: SENSORTEK TECHNOLOGY CORP., Jhubei (TW)

(72) Inventors: Wang-An Lin, Jhubei (TW); Ming-Che Yang, Jhubei (TW); Min-Chun Tuan, Jhubei (TW); Chung-Jung Wu, Jhubei (TW)

(73) Assignee: Sensortek Technology Corp., Jhubei (TW)

( * ) Notice: Subject to any disclaimer, the term of this patent is extended or adjusted under 35 U.S.C. 154(b) by 0 days.

(21) Appl. No.: 17/222,271

(22) Filed: Apr. 5, 2021

(65) Prior Publication Data
US 2022/0021387 A1     Jan. 20, 2022

Related U.S. Application Data

(60) Provisional application No. 63/005,432, filed on Apr. 5, 2020.

(51) Int. Cl.
*H03K 17/955*     (2006.01)
*G01R 27/26*     (2006.01)
(Continued)

(52) U.S. Cl.
CPC ....... *H03K 17/955* (2013.01); *G01R 27/2605* (2013.01); *G01V 3/088* (2013.01);
(Continued)

(58) Field of Classification Search
CPC ........ G01R 27/26; G01R 27/00; G01R 27/02; G01R 27/2605; H03K 17/00; H03K 17/94;
(Continued)

(56) References Cited

U.S. PATENT DOCUMENTS

| | | | | |
|---|---|---|---|---|
| 5,815,685 A | * | 9/1998 | Kamon | G06T 9/004 430/311 |
| 11,112,906 B2 | * | 9/2021 | Yamada | G06F 3/04186 |

(Continued)

FOREIGN PATENT DOCUMENTS

| | | | | |
|---|---|---|---|---|
| CN | 108958532 A | | 12/2018 | |
| CN | 109152445 B | * | 10/2020 | ........... A43B 1/0054 |

(Continued)

OTHER PUBLICATIONS

Office Action mailed to Corresponding Chinese Patent Application No. 202110369451.2 dated Jul. 23, 2024.

*Primary Examiner* — Hoai-An D. Nguyen
(74) *Attorney, Agent, or Firm* — Rosenberg, Klein & Lee

(57) ABSTRACT

The present application provides a proximity detection method and circuit thereof. The circuit includes a detection circuit, a baseline generating circuit, and a proximity sensing circuit. The proximity sensing circuit generates a proximity signal according to a detection data generated by the detection circuit, a baseline data generated by the baseline generating circuit and a proximity threshold, and judges whether the proximity signal is valid according to the detection data, a reference data, and a valid threshold. The validity of the proximity signal may be judged according to the reference data and the valid threshold and thus avoiding false judgement caused by the influences of the ambient factors.

22 Claims, 3 Drawing Sheets

(51) Int. Cl.
*G01V 3/08* (2006.01)
*G06F 1/3231* (2019.01)
*G06F 3/01* (2006.01)
*H03K 17/96* (2006.01)

(52) U.S. Cl.
CPC ............ *G06F 1/3231* (2013.01); *G06F 3/011* (2013.01); *H03K 17/962* (2013.01)

(58) Field of Classification Search
CPC .... H03K 17/945; H03K 17/955; H03K 17/96; H03K 2217/00; H03K 2217/94; H03K 2217/9401; H03K 2217/94026; H03K 2217/94031; H03K 2217/96; H03K 2217/9607; H03K 17/962; H03K 2217/960705; G06F 1/00; G06F 1/26; G06F 1/32; G06F 1/3203; G06F 1/3206; G06F 3/00; G06F 3/01; G06F 1/3231; G06F 3/011; G01V 3/00; G01V 3/08; G01V 3/088; G01D 5/00; G01D 5/12; G01D 5/14; G01D 5/24; G01D 5/2412; G01D 5/2417
USPC ........ 324/658, 660–663, 679, 686, 600, 649
See application file for complete search history.

(56) References Cited

U.S. PATENT DOCUMENTS

| | | | | |
|---|---|---|---|---|
| 11,150,113 | B2* | 10/2021 | Kunieda | ................ G01D 5/241 |
| 2014/0012528 | A1 | 1/2014 | Carmel-Veilleux et al. | |
| 2014/0176477 | A1* | 6/2014 | Nakao | ................ G06F 3/04883 |
| | | | | 345/173 |
| 2016/0179250 | A1* | 6/2016 | Nakajima | ........... G06F 3/04186 |
| | | | | 345/174 |
| 2019/0025962 | A1* | 1/2019 | Pang | ..................... G06F 3/0418 |
| 2019/0234765 | A1* | 8/2019 | Miyamoto | ......... H03K 17/9547 |
| 2019/0311291 | A1* | 10/2019 | Kim | ..................... G01R 19/00 |
| 2020/0232824 | A1* | 7/2020 | Kubo | .................. H03K 17/955 |

FOREIGN PATENT DOCUMENTS

| | | | | |
|---|---|---|---|---|
| JP | 2010257046 A | | 11/2010 | |
| JP | 2017167714 A | | 9/2017 | |
| JP | 2018081013 A | | 5/2018 | |
| JP | 2019149207 A | * | 9/2019 | ............. G06F 3/041 |
| WO | WO-2019176429 A1 | * | 9/2019 | ........... G06F 3/0416 |

* cited by examiner

PROXIMITY DETECTION METHOD AND CIRCUIT THEREOF

FIELD OF THE INVENTION

The present application relates generally to a detection method and a detection circuit, and particularly to a proximity detection method and the circuit thereof for reducing the possibility of false judgement.

BACKGROUND OF THE INVENTION

As technologies advance, electronic devices, for example, mobile phones and tablet computers, become indispensable in people's living and work. Most modern electronic devices are equipped with multiple sensors such as proximity sensors, ambient light sensors, and temperature sensors for supporting various functions. For example, the radio-frequency power is lowered when a human body approaches an electronic device; the brightness of a screen is adjusted automatically according to the ambient lightness; and the operation mode is adjusted according to the temperature of the electronic device.

A proximity sensor may detect if a human body is proximate to an electronic device without contacting the human body. Currently, capacitive proximity sensors are applied to the electronic devices extensively. The electronic device includes a sensing electrode, which is equivalent to a capacitor. The equivalent capacitance of the sensing electrode will be influenced and changed by human bodies and objects. By sensing the variation of the equivalent capacitance of the sensing electrode, whether a human body or an object is proximate to the electronic device may be detected by the proximity sensor. Unfortunately, ambient factors, for example, temperature or humidity, will influence the capacitance, leading to false judgement by the proximity sensors. The method for reducing the false judgement is highly urged by the field.

Accordingly, the present application provides a proximity detection method and the circuit thereof for reducing the possibility of the false judgement by the proximity sensors due to the influences of ambient factors.

SUMMARY

An objective of the present application is to provide a proximity detection method and the circuit thereof. The method and the circuit generates a proximity signal according to a detection data, a baseline data, and a proximity threshold, and judges if the proximity signal is valid according to the detection data, a reference data, and a valid threshold. The present application further judges the validity of the proximity signal for reducing the possibility of false judgement by the proximity sensors due to the influences of ambient factors.

The present application provides a proximity detection method, which comprises generating a baseline data according to a detection data; generating a proximity signal according to the detection data, the baseline data, and a proximity threshold; and judging if the proximity signal is valid according to the detection data, a reference data, and a valid threshold.

The present application further provides a proximity detection circuit, which comprises a detection circuit, a baseline generating circuit, and a proximity sensing circuit. The detection circuit generates a detection data. The baseline generating circuit generates a baseline data according to the detection data. The proximity sensing circuit generates a proximity signal according to the detection data, the baseline data, and a proximity threshold, and judges if the proximity signal is valid according to the detection data, a reference data, and a valid threshold. The proximity signal is used for indicating if a human body is proximate to an electronic device or away from the electronic device. The validity of the proximity signal may be judged according to the detection data, the reference data, and the valid threshold and thus reducing the problem of false judgement caused by the influences of ambient factors.

DETAILED DESCRIPTION

In the specifications and subsequent claims, certain words are used for representing specific circuits/devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising/including" is an open language and should be explained as "comprising/including but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In the applications of the proximity sensors, false judgement usually occurs due to the influences of ambient factors. The present application provides a proximity detection method and the circuit thereof for generating a proximity signal indicating proximity of a human body. The present application further judges the validity of the proximity signal for reducing the problem of false judgement due to the influences of ambient factors.

Figure 1:
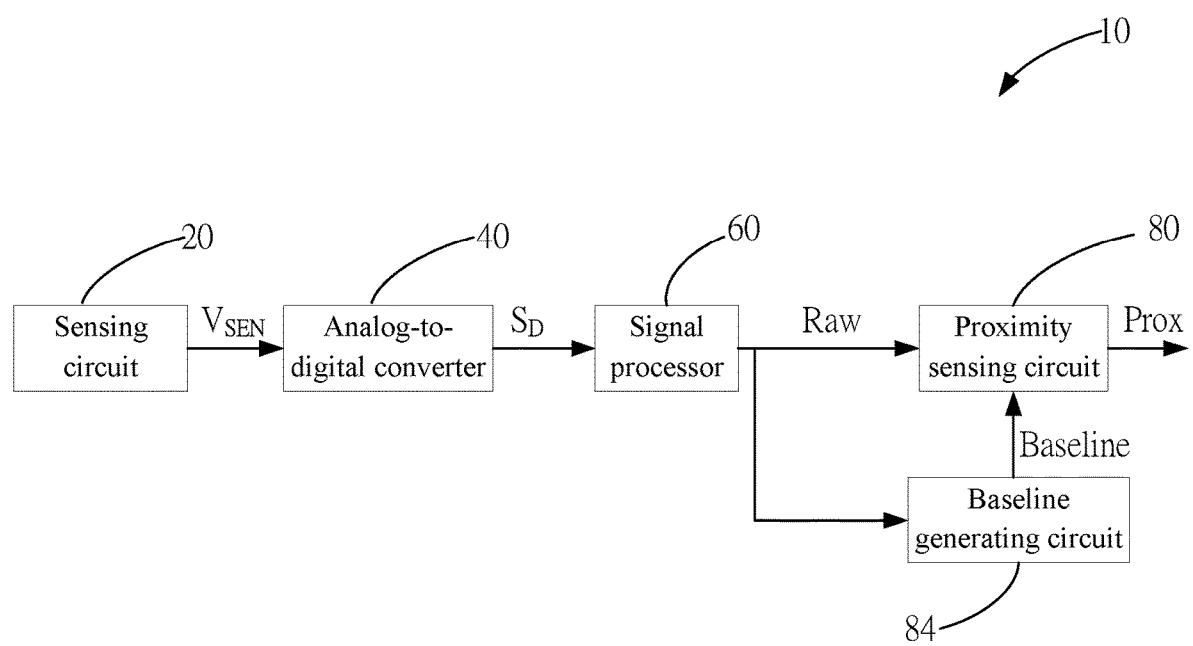
FIG. 1 shows a block diagram of the proximity detection circuit according to an embodiment of the present application.

Please refer to FIG. 1, which shows a block diagram of the proximity detection circuit according to an embodiment of the present application. According to the present embodiment of the present application, the proximity detection method is applied to a proximity detection circuit 10, which may be applied to smartphones, tablet computers, or other electronic devices. The proximity detection circuit 10 comprises a detection circuit, a proximity sensing circuit 80, and a baseline generating circuit 84. The detection circuit may include a sensing circuit 20, and an analog-to-digital converter (ADC) 40, and a signal processor 60. According to an embodiment of the present application, the sensing circuit 20 is a capacitive sensing circuit, which includes a sensing electrode (not shown in the figure) disposed in the electronic device and equivalent to a capacitor. The equivalent capacitance of the sensing electrode will be changed by the influences of human bodies or objects such as stylus pens or tables. The sensing circuit 20 may transmit a signal to the sensing electrode, which generates an electrical signal, such as a voltage signal or a charge signal, corresponding to the signal. The electrical signal is related to the equivalent capacitance of the sensing electrode. The sensing circuit 20 generates a sensing signal $V_{SEN}$ according to the electrical signal of the sensing electrode. The sensing signal $V_{SEN}$ is related to the equivalent capacitance of the sensing electrode. According to an embodiment of the present application, the sensing signal $V_{SEN}$ is an analog signal.

Figure 3:
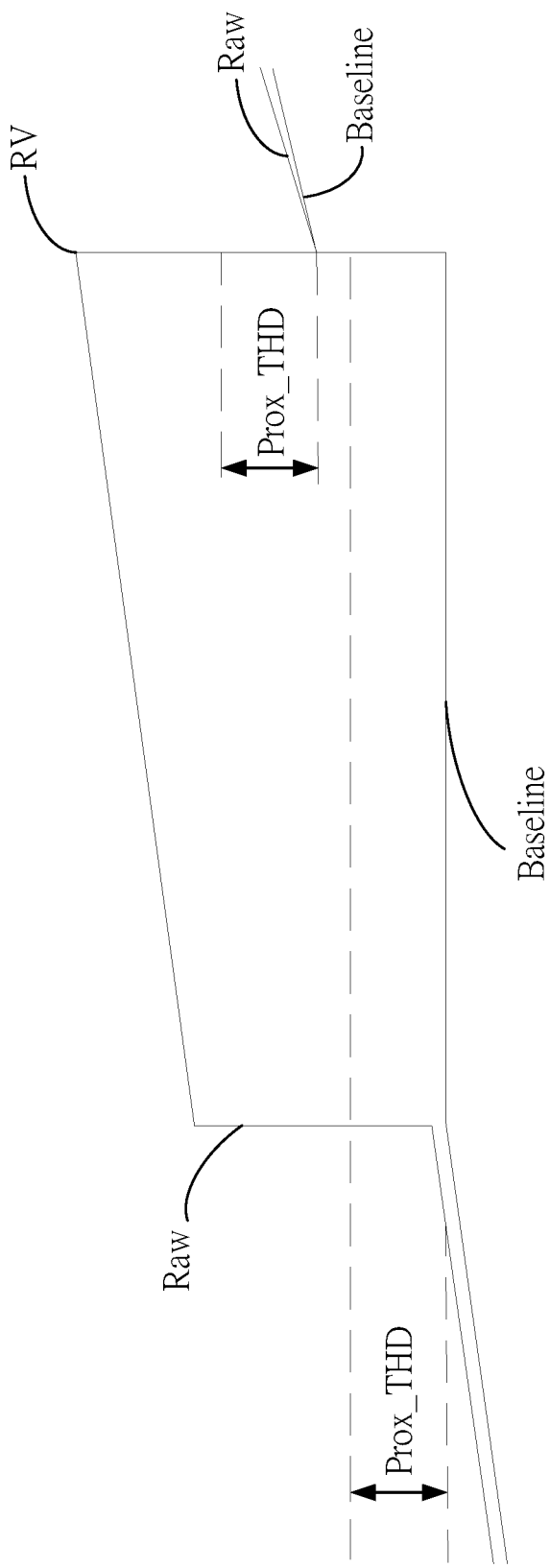
FIG. 3 shows a schematic diagram of the detection data, the baseline data, the proximity threshold, and the reference data according to an embodiment of the present application.

Please refer again to FIG. 1. The ADC 40 is coupled to the sensing circuit 20 and converts the sensing signal $V_{SEN}$ of the sensing circuit 20 to a digital signal $S_D$. The signal processor 60 is coupled to the ADC 40 and used for processing the digital signal $S_D$ for generating a detection data Raw. The value of the detection data Raw represents the equivalent capacitance of the sensing electrode. The signal processor 60 is coupled to the proximity sensing circuit 80 and the baseline generating circuit 84 for transmitting the detection data Raw to the proximity sensing circuit 80 and the baseline generating circuit 84. According to an embodiment of the present application, the signal processor 60 may receive and average multiple digital signals $S_D$ to obtain an average value as a value of the detection data Raw. Alternatively, the averaging is omitted. A digital signal $S_D$ is just a value of the detection data Raw. The signal processor 60 may also filter the digital signal $S_D$ for removing noises. The baseline generating circuit 84 generates a baseline data Baseline according to the detection data Raw. The baseline generating circuit 84 is coupled to the proximity sensing circuit 80 and transmits the baseline data Baseline to the proximity sensing circuit 80. The proximity sensing circuit 80 generates a proximity signal Prox according to the detection data Raw, the baseline data Baseline, and a proximity threshold Prox_THD, as shown in FIG. 3. The proximity signal Prox may represent proximity of a human body or an object to an electronic device. According to an embodiment of the present application, the value of the proximity signal Prox is 1, which represents proximity of a human body or an object to an electronic device. Alternatively, the value of the proximity signal Prox is 0, which represents proximity of a human body or an object to an electronic device. In addition, the proximity sensing circuit 80 may further judge if the proximity signal Prox is valid. If not, it means that a human body or an object is not proximate to an electronic device. Thereby, the problem of false judgement due to the influences of ambient factors may be avoided. In the following, the proximity detection method according to the present application will be described using examples.

Figure 2:
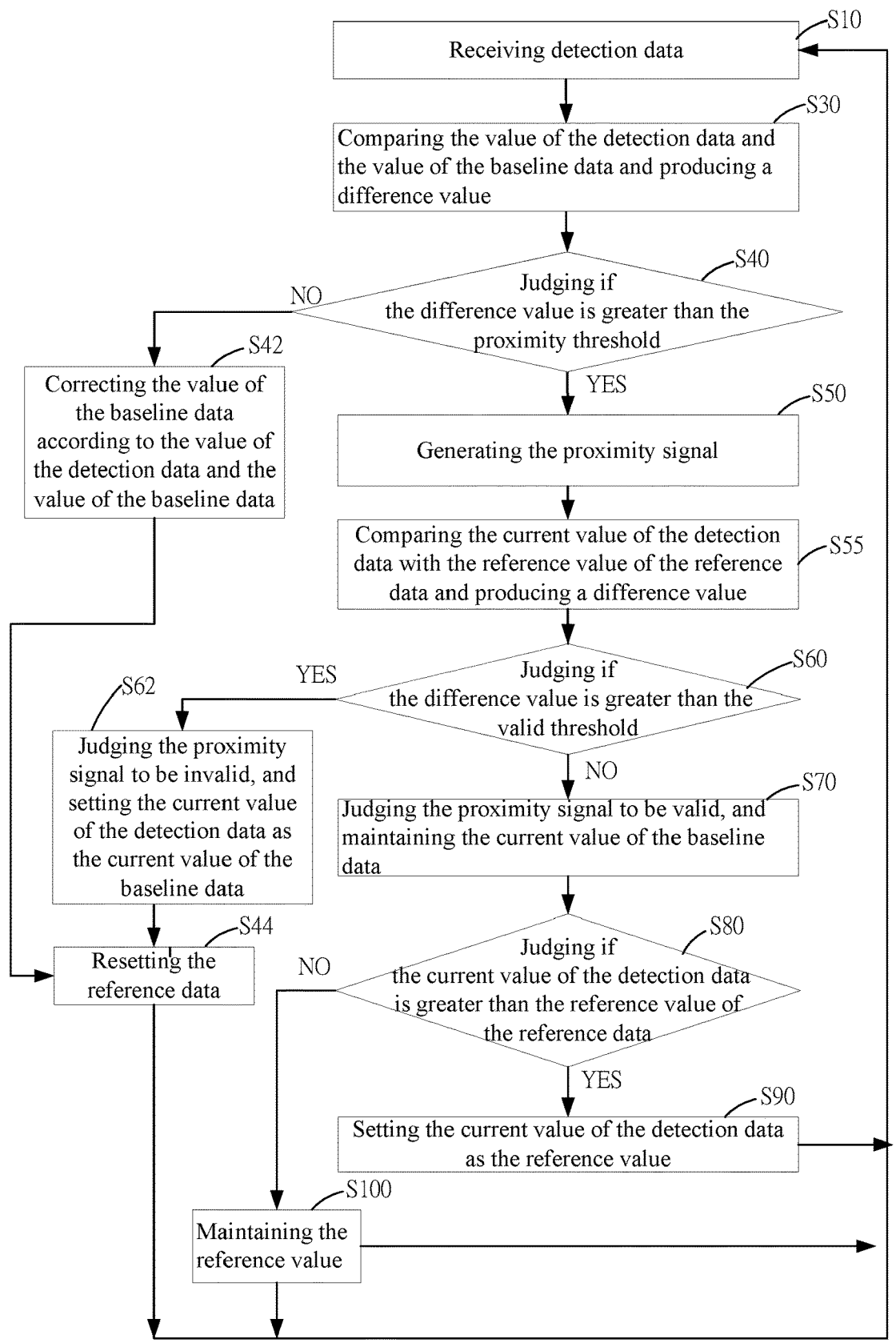
FIG. 2 shows a flowchart of the proximity detection method according to an embodiment of the present application.

Please refer to FIG. 2, which shows a flowchart of the proximity detection method according to an embodiment of the present application. As shown in the figure, the method comprises steps of:

Step S10: Receiving detection data;

Step S30: Comparing the value of the detection data and the value of the baseline data and producing a difference value;

Step S40: Judging if the difference value is greater than the proximity threshold; if yes, executing the step S50; and if not, executing the step S42;

Step S42: Correcting the value of the baseline data according to the value of the detection data and the value of the baseline data;

Step S44: Resetting the reference data;

Step S50: Generating the proximity signal;

Step S55: Comparing the current value of the detection data with the reference value of the reference data and producing a difference value;

Step S60: Judging if the difference value is greater than the valid threshold; if yes, executing the step S62; and if not, executing the step S70;

Step S62: Judging the proximity signal to be invalid, and setting the current value of the detection data as the current value of the baseline data;

Step S70: Judging the proximity signal to be valid, and maintaining the current value of the baseline data;

Step S80: Judging if the current value of the detection data is greater than the reference value of the reference data; if yes, executing the step S90; and if not, executing the step S100;

Step S90: Setting the current value of the detection data as the reference value; and Step S100: Maintaining the reference value.

Execute the step S10 of the proximity detection method. The detection circuit generates the detection data Raw, which is then received by the proximity sensing circuit 80 and the baseline generating circuit 84. In addition, the baseline generating circuit 84 generates the baseline data Baseline.

Please refer again to FIG. 2. Execute the step S30. The proximity sensing circuit 80 compares the value of the detection data Raw with the value of the baseline data Baseline to produce the difference value. According to an embodiment of the present application, the proximity sensing circuit 80 compares the current value (the n-th value) of the detection data Raw with a previous value (the (n−1)-th value) of the baseline data Baseline to produce the difference value. The proximity sensing circuit 80 next executes the step S40 to judge if the difference value is greater than the proximity threshold Prox_THD (as shown in FIG. 3). When the difference value is greater than the proximity threshold Prox_THD, it means that an object or a human body is proximate to the electronic device and leading to a significant increase in capacitance. Thereby, the proximity sensing circuit 80 executes the step S50 to generate the proximity signal Prox. The proximity threshold Prox_THD may be set according to the design requirements. According to the above description, the proximity sensing circuit 80 generates the proximity signal Prox according to the detection data Raw, the baseline data Baseline, and the proximity threshold Prox_THD.

According to an embodiment of the present application, the baseline generating circuit 84 generates the baseline data Baseline according to the detection data Raw. At first, when the baseline generating circuit 84 receives the first value of the detection data Raw, the first value of the detection data Raw is used as the initial value of the baseline data Baseline. The proximity sensing circuit 80 compares the first value of the detection data Raw with the initial value of the baseline data Baseline and give 0 as the difference value. Since the difference value is less than the proximity threshold Prox_THD, the baseline generating circuit 84 executes the step S42 for correcting the value of the baseline data Baseline according to the value of the detection data Raw and the value of the baseline data Baseline. According to an embodiment of the present application, the baseline generating circuit 84 generates the current value (the n-th value) of the baseline data Baseline according to the current value (the n-th value) of the detection data Raw and a previous value (the (n−1)-th value) of the baseline data Baseline, which may be expressed as Baseline[n]=G*Raw[n]+(1−G)*Baseline[n−1]. G is a parameter greater than zero and less than 1, and may be set according to the requirement; and n is a positive integer greater than 1.

Next, the baseline generating circuit 84 receives the first value of the detection data Raw and generates the current value of the baseline data Baseline to replace the initial value of the baseline data Baseline. The baseline generating circuit 84 generates the current value as the first value of the baseline data Baseline according to the first value of the detection data Raw and the previous value (the initial value) of the baseline data Baseline. Then, when the proximity sensing circuit 80 receives a second value of the detection data Raw, it compares the second value of the detection data Raw with the first value of the baseline data Baseline to produce the difference value, and compares if the difference value is greater than the proximity threshold Prox_THD for judging whether a human body or an object is proximate to the electronic device. Like the above description, if the difference value between the second value of the detection data Raw and the first value of the baseline data Baseline is less than the proximity threshold Prox_THD, the baseline generating circuit 84 generates the second value of the baseline data Baseline according to the second value of the detection data Raw and the first value of the baseline data Baseline. Afterwards, when the proximity sensing circuit 80 receives a third value of the detection data Raw, it compares the third value of the detection data Raw with the second value of the baseline data Baseline to produce the difference value, and compares if the difference value is greater than the proximity threshold Prox_THD for judging whether a human body or an object is proximate to the electronic device.

After the proximity sensing circuit 80 generates the proximity signal Prox, the step S55 is executed for comparing the current value of the detection data Raw with the reference value RV of the reference data and producing a difference value. Next, the step S60 is executed for judging if the difference value between the current value of the detection data Raw and the reference value RV of the reference data is greater than the valid threshold. If the difference value is less than the valid threshold, step S70 is executed by the proximity sensing circuit 80 for judging the proximity signal Prox to be valid and driving the baseline generating circuit 84 to maintain the current value of the baseline data Baseline, namely, fixing the value of the baseline data Baseline, until the subsequent judgement of departure of the object or the human body. The valid threshold may be set according to the design requirements. In short, the proximity sensing circuit 80 judges the validity of the proximity signal Prox according to the detection data Raw, the reference data, and the valid threshold.

If the proximity sensing circuit 80 judges that the difference value between the third value of the detection data Raw and the second value of the baseline data Baseline is greater than the proximity threshold Prox_THD, it means that a human body or an object is proximate to the electronic device. As shown in FIG. 3, when the proximity signal Prox is judged to be valid, maintain the current value of the baseline data Baseline. In other words, the value of the baseline data Baseline is fixed and unchanged. Afterwards, if the ambient factors, for example, the temperature, are changed, the capacitance will be increased, which means the value of the detection data Raw is increased. On the other hand, the value of the baseline data Baseline is fixed. When an object or a human body departs away from the electronic device, although the value of the detection data Raw is decreased, the difference value between the current decreased value of the detection data Raw and the current value of the baseline data Baseline is still greater than the proximity threshold Prox_THD. It is then judged that the object or the human body has not departed away from the electronic device, and hence leading to misjudgment. When the proximity sensing circuit 80 judges that the difference value between the current value of the detection data Raw and the reference value RV of the reference data is greater than the valid threshold, the proximity sensing circuit 80 judges that the above situation occurs and executes the step S62 for judging the proximity signal Prox to be invalid and driving the baseline generating circuit 84 to set the current value (the n-th value) of the detection data Raw as the current value (the n-th value) of the baseline data Baseline and thus correcting the baseline data Baseline. Then, receive the next value (the (n+1)-th value) of the detection data Raw and compare the (n+1)-th value of the detection data Raw with the n-th value of the baseline data Baseline for producing the difference value. This difference value is compared with the proximity threshold Prox_THD for judging if an object or a human body is proximate to the electronic device. After executing the step S62, the step S44 is executed for resetting the reference value RV of the reference data. For example, the reference value RV may be set to be 0. In addition, after executing the step S42, the step S44 is executed next. According to an embodiment of the present application, it is not required to reset the reference value RV of the reference data.

According to an embodiment of the present application, the reference value RV of the reference data may be set in advance and may be modified later. When the proximity signal Prox is judged to be valid, it is judged that an object or a human body is proximate to the electronic device. Then the proximity sensing circuit 80 executes the step S80 for comparing if the current value of the detection data Raw is greater than the reference value RV of the reference data. If so, the step S90 will be executed for setting the current value of the detection data Raw as the reference value RV of the reference data, as shown in FIG. 3. That is, the proximity sensing circuit 80 continuously tracks the value of the detection data Raw and the maximum value of the detection data Raw is used as the reference value RV of the reference data in the state that an object or a human body is proximate to the electronic device. If the proximity sensing circuit 80 judges that the current value of the detection data Raw is less than the reference value RV of the reference data, the step S100 is executed for maintaining the reference value RV of the reference data.

To sum up, the present application provides a proximity detection method and the circuit thereof. The method and circuit generates the proximity signal according to the detection data, the baseline data, and the proximity threshold, and judges if the proximity signal is valid according to the detection data, the reference data and the valid threshold. The present application further judges the validity of the proximity signal according to the reference data and the valid threshold for reducing the possibility of false judgement due to the influences of ambient factors.

Those skilled in the art will readily observe that numerous modifications and alterations of the circuit and structure may be made while retaining the teachings of the invention. Accordingly, the above disclosure should be construed as limited only by the metes and bounds of the appended claims.

What is claimed is:

1. A proximity detection method, applied to an electronic device, comprising:
   detecting a capacitance of an electrode for generating a detection data by a detection circuit;
   generating a baseline data according to said detection data by a baseline generating circuit receiving said detection data;
   generating a proximity signal according to a proximity threshold and a difference value between said detection data and said baseline data by a proximity sensing circuit receiving said detection data and said baseline data, wherein said proximity signal represents the proximity of a human body or an object to said electronic device; and
   judging said proximity signal is valid or not to confirm that the proximity is occurred or not according to said detection data, a reference data, and a valid threshold by said proximity sensing circuit.

2. The proximity detection method of claim 1, further comparing a nth value of said detection data with a (n−1)th value of said baseline data for generating said difference value, and generating said proximity signal when said difference value is greater than said proximity threshold, wherein n is a positive integer and greater than 1.

3. The proximity detection method of claim 2, further generating said (n−1)th value of said baseline data according to a (n−1)th value of said detection data and a (n−2)th value of said baseline data, wherein n is a positive integer and greater than 2.

4. The proximity detection method of claim 1, further comprising:
   comparing a nth value of said detection data with a (n−1)th value of said baseline data for generating said difference value, and generating a nth value of said baseline data according to said nth value of said detection data and said (n−1)th value of said baseline data when said difference value is less than said proximity threshold; and
   comparing a (n+1)th value of said detection data with said nth value of said baseline data for generating said difference value, and generating said proximity signal when said difference value between said (n+1)th value of said detection data and said nth value of said baseline data is greater than said proximity threshold;
   where n is a positive integer and greater than 1.

5. The proximity detection method of claim 1, further comparing a current value of said detection data with a reference value of said reference data for generating a difference value between said current value of said detection data and said reference value of said reference data, and judging said proximity signal is valid according to said valid threshold and said difference value between said current value of said detection data and said reference value of said reference data.

6. The proximity detection method of claim 1, further resetting said reference data when said proximity signal is invalid.

7. The proximity detection method of claim 1, further correcting said baseline data when said proximity signal is invalid.

8. The proximity detection method of claim 7, further comprising:
   setting a nth value of said detection data as a nth value of said baseline data; and
   comparing a (n+1)th value of said detection data with said nth value of said baseline data for generating said difference value, and generating said proximity signal when said difference value is greater than said proximity threshold, wherein n is a positive integer and greater than 1.

9. The proximity detection method of claim 1, further maintaining a current value of said baseline data when said proximity signal is valid.

10. The proximity detection method of claim 1, further comparing a reference value of said reference data with a current value of said detection data when said proximity signal is valid, and setting said current value of said detection data as said reference value when said current value of said detection data is greater than said reference value.

11. The proximity detection method of claim 1, further comparing a reference value of said reference data with a current value of said detection data when said proximity signal is valid, and maintaining said reference value when said current value of said detection data is less than said reference value.

12. A proximity detection circuit applied to an electronic device, comprising:
   a detection circuit, detecting a capacitance of an electrode for generating a detection data;
   a baseline generating circuit, coupled to said detection circuit, and generating a baseline data according to said detection data; and
   a proximity sensing circuit, coupled to said detection circuit and said baseline generating circuit, generating a proximity signal according to a proximity threshold and a difference value between said detection data and said baseline data, wherein said proximity signal represents the proximity of a human body or an object to said electronic device; and said proximity sensing circuit judging said proximity signal is valid or not to confirm that the proximity is occurred or not according to said detection data, a reference data, and a valid threshold.

13. The proximity detection circuit of claim 12, wherein said proximity sensing circuit compares a nth value of said detection data with a (n−1)th value of said baseline data for generating said difference value, and generates said proximity signal when said difference value is greater than said proximity threshold, wherein n is a positive integer and greater than 1.

14. The proximity detection circuit of claim 13, wherein said baseline generating circuit generates said (n−1)th value of said baseline data according to a (n−1)th value of said detection data and a (n−2)th value of said baseline data, wherein n is a positive integer and greater than 2.

15. The proximity detection circuit of claim 12, wherein said proximity sensing circuit compares a nth value of said detection data with a (n−1)th value of said baseline data for generating said difference value, and generates a nth value of said baseline data according to said nth value of said detection data and said (n−1)th value of said baseline data when said difference value is less than said proximity threshold; and said proximity sensing circuit compares a (n+1)th value of said detection data with said nth value of said baseline data for generating said difference value, and generates said proximity signal when said difference value between said (n+1)th value of said detection data and said nth value of said baseline data is greater than said proximity threshold, wherein n is a positive integer and greater than 1.

16. The proximity detection circuit of claim 12, wherein said proximity sensing circuit compares a current value of said detection data with a reference value of said reference data for generating a difference value between said current value of said detection data and said reference value of said reference data, and judges said proximity signal is valid according to said valid threshold and said difference value between said current value of said detection data and said reference value of said reference data.

17. The proximity detection circuit of claim 12, wherein said proximity sensing circuit resets said reference data when said proximity signal is invalid.

18. The proximity detection circuit of claim 12, wherein said baseline generating circuit corrects said baseline data when said proximity signal is invalid.

19. The proximity detection circuit of claim 18, wherein said baseline generating circuit sets a nth value of said detection data as a nth value of said baseline data; and said proximity sensing circuit compares a (n+1)th value of said detection data with said nth value of said baseline data for generating said difference value, and generates said proximity signal when said difference value is greater than said proximity threshold, wherein n is a positive integer and greater than 1.

20. The proximity detection circuit of claim 12, wherein said baseline generating circuit maintains a current value of said baseline data when said proximity signal is valid.

21. The proximity detection circuit of claim 12, wherein said proximity sensing circuit compares a reference value of said reference data with a current value of said detection data when said proximity signal is valid, and sets said current value of said detection data as said reference value when said current value of said detection data is greater than said reference value.

22. The proximity detection circuit of claim 12, wherein said proximity sensing circuit compares a reference value of said reference data with a current value of said detection data when said proximity signal is valid, and maintains said reference value when said current value of said detection data is less than said reference value.

* * * * *